United States Patent
Lee et al.

(10) Patent No.: US 9,504,015 B2
(45) Date of Patent: Nov. 22, 2016

(54) METHOD AND APPARATUS FOR RECEIVING SERVICE IN WIRELESS COMMUNICATION SYSTEM

(71) Applicant: LG ELECTRONICS INC., Seoul (KR)

(72) Inventors: Youngdae Lee, Anyang-si (KR); Sungjun Park, Anyang-si (KR); Seungjune Yi, Anyang-si (KR); Sunghoon Jung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 31 days.

(21) Appl. No.: 14/394,716

(22) PCT Filed: Apr. 23, 2013

(86) PCT No.: PCT/KR2013/003437
§ 371 (c)(1),
(2) Date: Oct. 15, 2014

(87) PCT Pub. No.: WO2013/162243
PCT Pub. Date: Oct. 31, 2013

(65) Prior Publication Data
US 2015/0078244 A1    Mar. 19, 2015

Related U.S. Application Data

(60) Provisional application No. 61/637,837, filed on Apr. 24, 2012.

(51) Int. Cl.
| | |
|---|---|
| *H04W 72/00* | (2009.01) |
| *H04W 36/04* | (2009.01) |
| *H04W 4/06* | (2009.01) |
| *H04W 36/00* | (2009.01) |
| *H04W 84/04* | (2009.01) |

(52) U.S. Cl.
CPC ............ *H04W 72/005* (2013.01); *H04W 4/06* (2013.01); *H04W 36/0016* (2013.01); *H04W 36/04* (2013.01); *H04W 84/045* (2013.01)

(58) Field of Classification Search
CPC ........................................ H04W 36/00–36/385
See application file for complete search history.

(56) References Cited

U.S. PATENT DOCUMENTS

| | | | | |
|---|---|---|---|---|
| 6,381,461 | B1 * | 4/2002 | Besson | H04W 36/06 370/330 |
| 6,454,981 | B1 * | 9/2002 | Lee | B29C 44/5609 264/155 |
| 8,588,782 | B2 * | 11/2013 | Lee | H04W 36/0061 370/331 |
| 9,319,947 | B2 * | 4/2016 | Jung | H04W 8/186 |
| 9,386,499 | B2 * | 7/2016 | Ohm | H04W 36/32 |
| 2006/0068789 | A1 * | 3/2006 | Vannithamby | H04W 36/0055 455/436 |

(Continued)

OTHER PUBLICATIONS

Kyocera, "MBMS service continuity for inbound mobility to non-MBMS capable cells," 3GPP TSG-RAN WG2 #75, R2-114095, Aug. 2011, 5 pages.

(Continued)

*Primary Examiner* — Warner Wong
(74) *Attorney, Agent, or Firm* — Lee Hong Degerman Kang & Waimey

(57) ABSTRACT

A method and apparatus for receiving a service in a wireless communication system is provided. A user equipment (UE) receives a service from a first node serving a first cell, detects a second cell not providing the service, and determines whether to transmit a message for the second cell to the first node according to a preference for the service.

7 Claims, 10 Drawing Sheets

(56) References Cited

U.S. PATENT DOCUMENTS

| | | | | |
|---|---|---|---|---|
| 2009/0003279 | A1* | 1/2009 | Abusch-Magder | H04W 36/0083 370/331 |
| 2009/0005052 | A1* | 1/2009 | Abusch-Magder ... | H04W 24/02 455/446 |
| 2010/0227611 | A1 | 9/2010 | Schmidt et al. | |
| 2011/0105083 | A1* | 5/2011 | Wu ..................... | H04W 12/08 455/411 |
| 2011/0189994 | A1* | 8/2011 | Zinser ................. | G10L 19/173 455/436 |
| 2011/0281586 | A1* | 11/2011 | Yu ....................... | H04W 36/165 455/436 |
| 2012/0028645 | A1* | 2/2012 | Kim ..................... | H04W 48/06 455/444 |
| 2012/0033679 | A1* | 2/2012 | Horn ................... | H04W 48/10 370/401 |
| 2012/0224564 | A1* | 9/2012 | Paisal .................. | H04N 7/148 370/331 |
| 2013/0237225 | A1* | 9/2013 | Martin ............. | H04W 36/0055 455/436 |
| 2014/0029580 | A1* | 1/2014 | Jung ................... | H04W 36/08 370/331 |

OTHER PUBLICATIONS

LG Electronics, "Reception of MBMS service and non-MBMS service," 3GPP TSG-RAN WG2 #67bis, R2-095904, Oct. 2009, 2 pages.

PCT International Application No. PCT/KR2013/003437, Written Opinion of the International Searching Authority dated Jul. 22, 2013, 1 page.

* cited by examiner

METHOD AND APPARATUS FOR RECEIVING SERVICE IN WIRELESS COMMUNICATION SYSTEM

CROSS-REFERENCE TO RELATED APPLICATIONS

This application is the National Stage filing under 35 U.S.C. 371 of International Application No. PCT/KR2013/003437, filed on Apr. 23, 2013, which claims the benefit of U.S. Provisional Application Ser. No. 61/637,837, filed on Apr. 24, 2012, the contents of which are hereby incorporated by reference herein in their entirety.

BACKGROUND OF THE INVENTION

1. Field of the Invention

The present invention relates to wireless communications, and more particularly, to a method and apparatus for receiving a service in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE can provide a multimedia broadcast/multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

A closed subscriber group (CSG) identifies subscribers of an operator who are permitted to access one or more cells but which have restricted access (CSG cells). A CSG cell broadcasts a CSG indicator set to true and a specific CSG identity. A CSG whitelist is a list stored in a UE containing CSG identities of the CSG cells to which the subscriber belongs.

Generally, if a UE is in a proximity of a CSG cell, the UE performs a handover procedure to the CSG cell. The UE may be handed over to the CSG cell while receiving an MBMS service from a source cell. If the UE is interested in receiving the MBMS service, the UE may not want to be handed over to the CSG cell.

Accordingly, an operation of a UE between MBMS service continuity and mobility to a CSG cell is required.

SUMMARY OF THE INVENTION

The present invention provides a method and apparatus for receiving a service in a wireless communication system. The present invention provides a method for determining, by a user equipment (UE), whether to transmit a proximity indication for a closed subscriber group (CSG) cell according to a preference for a multimedia broadcast/multicast service (MBMS) service while receiving the MBMS service.

In an aspect, a method for receiving, by a user equipment (UE), a service in a wireless communication system is provided. The method includes receiving a service from a first node, the first node serving a first cell, detecting a second cell, not providing the service, neighboring the UE, determining whether to transmit a message for the second cell to the first node according to a preference for the service.

The method may further include transmitting the message to the first node if it is determined to transmit the message for the second cell.

It may be determined to transmit the message for the second cell if the service is not preferred according to the preference for the service.

The service may be a multimedia broadcast/multicast service (MBMS) service.

The second cell may be a closed subscriber group (CSG) cell.

The UE may be a member of the CSG cell.

The message may be a one of a proximity indication or a measurement report.

The message may indicate a priority between the service and the second cell.

The message may indicate entering the second cell or leaving the second cell.

In another aspect, a user equipment (UE) in a wireless communication system is provided. The UE includes a radio frequency (RF) unit for transmitting or receiving a radio signal, and a processor coupled to the RF unit, and configured for receiving a service from a first node, the first node serving a first cell, detecting a second cell, not providing the service, neighboring the UE, determining whether to transmit a message for the second cell to the first node according to a preference for the service.

A UE can receive an MBMS service even if the UE is in a proximity of a CSG cell.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC- FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
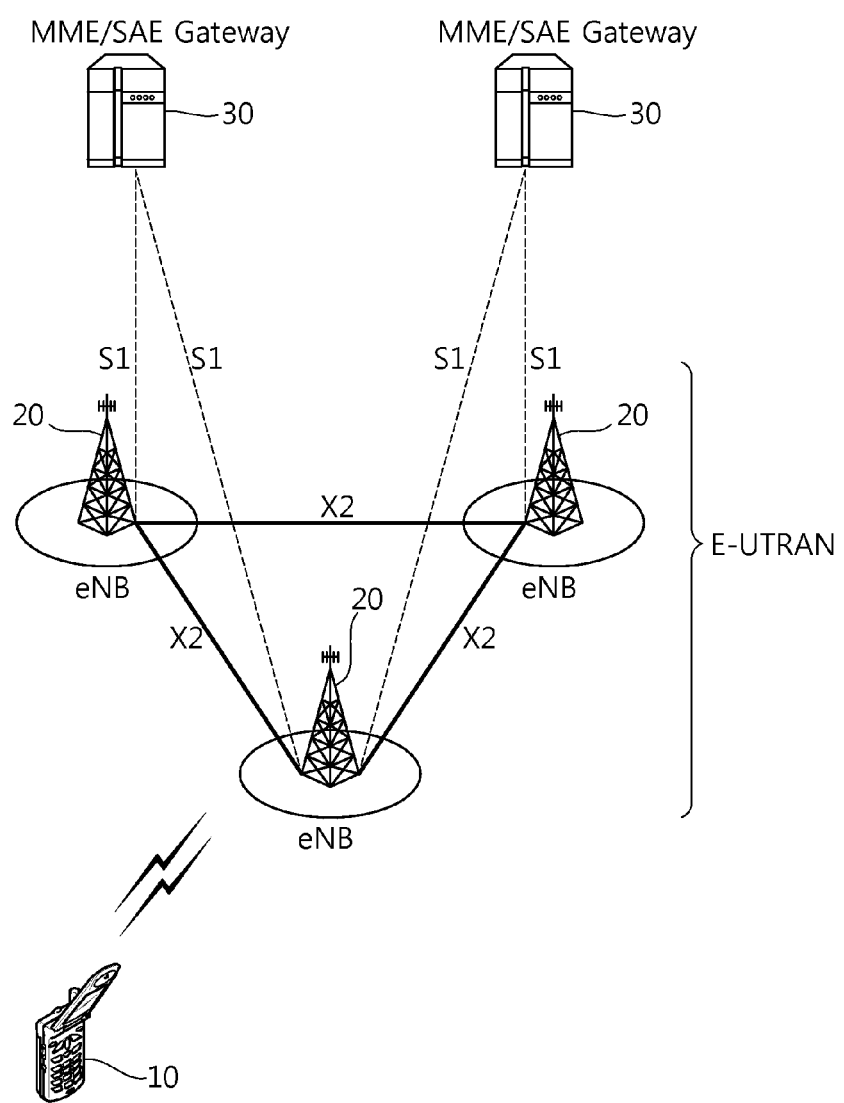
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
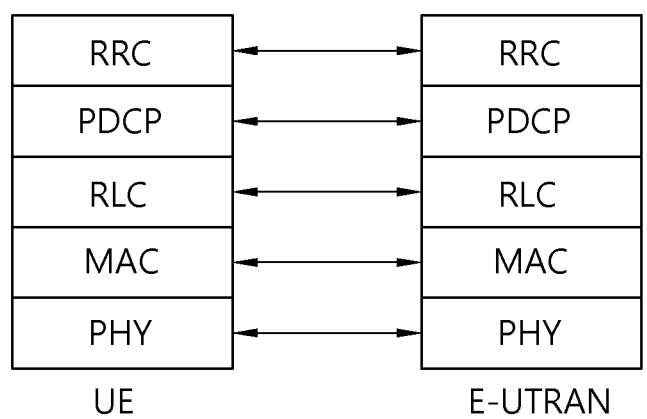
FIG. 2 is a diagram showing a radio interface protocol architecture for a control plane.
Figure 3:
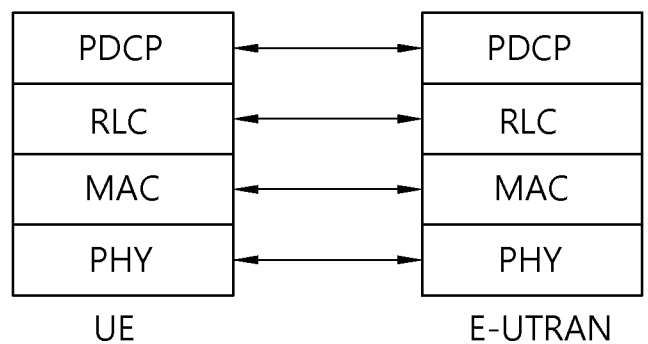
FIG. 3 is a diagram showing a radio interface protocol architecture for a user plane.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
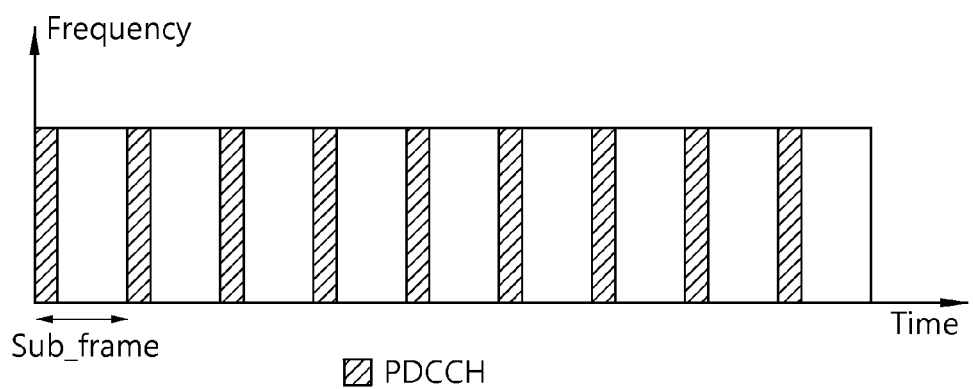
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane. An RRC state indicates whether the RRC of the UE is logically connected to the RRC of the E-UTRAN. When an RRC connection is established between an RRC layer of the UE and an RRC layer of the network, the UE is in an RRC connected state (RRC_CONNECTED), and otherwise the UE is in an RRC idle state (RRC_IDLE).

A non-access stratum (NAS) layer belongs to an upper layer of the RRC layer and serves to perform session management, mobility management, or the like.

A multimedia broadcast/multicast service (MBMS) service can be provided by using a single frequency network (SFN) through a frequency layer shared with a non-MBMS service. A UE which intends to receive the MBMS service can acquire information of the MBMS service provided on a current carrier frequency by using control information which is broadcast at a frequency on which the MBMS service is provided. In addition, according to a situation, the UE may also desire to receive an MBMS service provided on another carrier frequency other than the current carrier frequency.

As a transport channel for an MBMS, an MCH can be mapped to a multicast control channel (MCCH) which is a logical channel for a control signal and a multicast traffic channel (MTCH) which is a logical channel for data. The MCCH can transmit an MBMS-related RRC message. The MTCH can transmit traffic of a specific MBMS service. A single MCCH channel may exist for every single MBSFN for transmitting MBMS information and traffic. Alternatively, when a plurality of MBSFN areas are provided in a single cell, the UE may receive a plurality of MCCHs. When the MBMS-related RRC message is changed in a specific MCCH, the PDCCH can transmit an MBMS radio network temporary identity (M-RNTI) and an MCCH indicator indicating a specific MCCH. By receiving the M-RNTI and the MCCH indicator through the PDCCH, the UE supporting the MBMS can determine that the MBMS-related RRC message is changed in the specific MCCH and can receive the specific MCCH. An RRC message of the MCCH can be changed in every modification period, and can be repetitively broadcast in every repetition period.

Meanwhile, the network can use a counting procedure to calculate the number of UEs receiving a specific service. The counting procedure can be configured such that the network transmits a counting request message, and then the UE transmits a counting response message.

An inbound mobility to closed subscriber group (CSG) cells is described. It may refer to a section 10.5.1 of 3GPP TS 36.300 V10.5.0 (2011 September).

First, an inbound mobility to CSG cells when a UE is in RRC_IDLE is described.

a cell selection/reselection to CSG cells is based on a UE autonomous search function. The search function determines itself when/where to search, and need not be assisted by a network with information about frequencies which are dedicated to the CSG cells.

To assist the search function on mixed carriers, all CSG cells on mixed carriers broadcast in system information a range of physical cell identity (PCI) values reserved by the network for use by CSG cells. Optionally also non-CSG cells on the mixed carrier can send this information in the system information. The reserved PCI range is only applicable to the frequency of a public land mobile network (PLMN) where the UE received this information. The UE considers the last received reserved range of PCI values for the CSG cells to be valid for a maximum of 24 hours within the entire PLMN. UE's use of the received PCI split information is a UE implementation dependent.

The UE checks the suitability of the CSG cells (identified by the 1 bit indicator) based on the CSG whitelist in the UE (provided by upper layers). A CSG cell is only suitable for a UE if it belongs to its CSG whitelist.

The automated searching for the CSG cells by the UE shall be disabled by the search function, if the CSG whitelist configured in the UE is empty.

In addition, manual selection of the CSG cells is supported.

A cell selection/reselection to the CSG cells does not require the network to provide neighbor cell information to the UE. The neighbor cell information can be provided to help the UE in specific cases, e.g. where the network wishes to trigger the UE to search for the CSG cells.

A cell reselection between allowed CSG cells is based on normal cell reselection procedure.

An inbound mobility to CSG cells when a UE is in RRC_CONNECTED is described.

While a UE is in RRC_CONNECTED, the UE performs normal measurement and mobility procedures based on a configuration provided by the network.

The UE is not required to support manual selection of CSG IDs while in RRC_CONNECTED.

Handover to home NodeB (HNB)/home eNodeB (HeNB) follows framework of UE assisted network controlled handover. Handover to a HNB/HeNB is different from the normal handover procedure in three aspects:

1. Proximity estimation: in case the UE is able to determine, using autonomous search procedures, that it is near a CSG or hybrid cell whose CSG ID is in the UE's CSG whitelist, the UE may provide to the source eNB an indication of proximity. The proximity indication may be used as follows:

If a measurement configuration is not present for the concerned frequency/radio access technology (RAT), the source eNB may configure the UE to perform measurements and reporting for the concerned frequency/RAT.

The source eNB may determine whether to perform other actions related to handover to HNB/HeNBs based on having received a proximity indication (for example, the source eNB may not configure the UE to acquire the system information of the HNB/HeNB unless it has received a proximity indication).

2. Physical scrambling code (PSC)/PCI confusion: due to the typical cell size of HNB/HeNBs being much smaller than macro cells, there can be multiple HNBs/HeNBs within the coverage of the source eNB that have the same PSC/PCI. This leads to a condition referred to as PSC/PCI confusion, wherein the source eNB is unable to determine the correct target cell for handover from the PSC/PCI included in the measurement reports from the UE. The PSC/PCI confusion is solved by the UE reporting the global cell identity of the target HNB/HeNB.

3. Access control: if the target cell is a hybrid cell, prioritization of allocated resources may be performed based on the UE's membership status. Access control is done by a two step process, where first the UE reports the membership status based on the CSG ID received from the target cell and the UE's CSG whitelist, and then the network verifies the reported status. When the UE has an emergency call, an MME allows inbound mobility to the CSG cells even if the access control fails.

Figure 5:
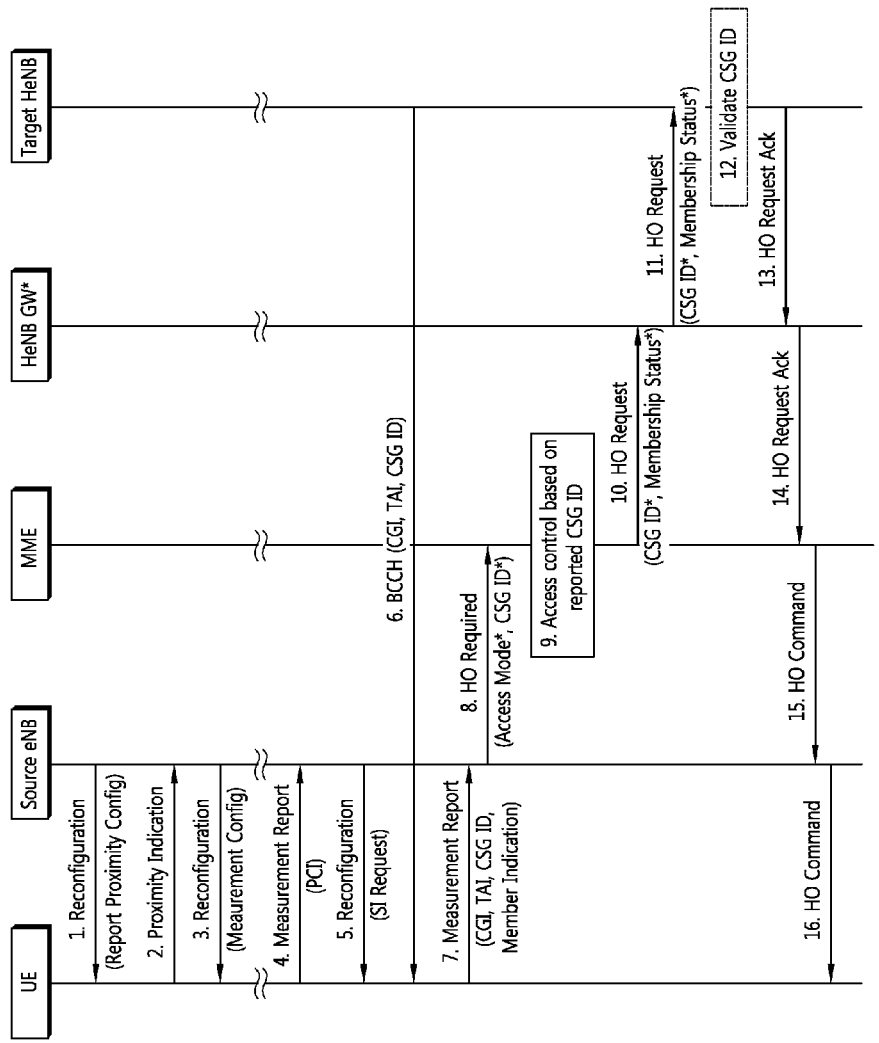
FIG. 5 shows an example of mobility to HeNB's CSG and hybrid cells.

FIG. 5 shows an example of mobility to HeNB's CSG and hybrid cells.

Mobility from eNB/HeNB to a HeNB's CSG/hybrid cell takes place with an S1 handover procedure. In the following call flow, the source cell can be an eNB or a HeNB. In addition, the procedure applies to any scenario where the CSG ID is provided by the UE or provided by the source eNB.

1. The source eNB configures the UE with proximity indication control.

2. The UE sends an entering proximity indication when it determines it may be near a cell (based on autonomous search procedures) whose CSG ID is in the UE's CSG whitelist. The proximity indication includes the RAT and frequency of the cell.

3. If a measurement configuration is not present for the concerned frequency/RAT, the source eNB configures the UE with relevant measurement configuration including measurement gaps as needed, so that the UE can perform measurements on the reported RAT and frequency. The network may also use the proximity indication to minimize the requesting of handover preparation information of CSG/hybrid cells by avoiding requesting such information when the UE is not in the geographical area where cells whose CSG IDs are in the UEs CSG White-list are located.

4. The UE sends a measurement report including the PCI (e.g., due to triggered event A3).

5. The source eNB configures the UE to perform SI acquisition and reporting of a particular PCI.

6. The UE performs SI acquisition using autonomous gaps, i.e., the UE may suspend reception and transmission with the source eNB within the limits to acquire the relevant system information from the target HeNB.

7. The UE sends a measurement report including (E-)CGI, TAI, CSG ID and "member/non-member" indication.

8. The source eNB includes the target E-CGI and the CSG ID in the handover required message sent to the MME. If the target is a hybrid cell, the cell access mode of the target is included.

9. The MME performs UE access control to the CSG cell based on the CSG ID received in the handover required message and the stored CSG subscription data for the UE. If the access control procedure fails, the MME ends the handover procedure by replying with the handover preparation failure message. If the cell access mode is present, the MME determines the CSG membership status of the UE handing over to the hybrid cell and includes it in the handover request message.

10-11. The MME sends the handover request message to the target HeNB including the target CSG ID received in the handover required message. If the target is a hybrid cell, the CSG membership status will be included in the handover request message.

12. The target HeNB verifies that the CSG ID received in the handover request message matches the CSG ID broadcast in the target cell and if such validation is successful it allocates appropriate resources. UE prioritization may also be applied if the CSG membership status indicates that the UE is a member.

13-14. The target HeNB sends the handover request acknowledge message to the MME via the HeNB GW if present.

15. The MME sends the handover command message to the source eNB.

16. The source eNB transmits the handover command (RRC connection reconfiguration message including mobility control information) to the UE.

After sending the entering proximity indication (step 2), if the UE determines that it is no longer near a cell whose CSG ID is in the UE's CSG whitelist, the UE sends a leaving proximity indication to the source eNB. Upon reception of this indication, the source eNB may reconfigure the UE to stop measurements on the reported RAT and frequency.

In the above procedure, steps 2 and 3 may not be performed in case the UE has not previously visited the HeNB, e.g., when the UE first visits a hybrid cell.

The PCI confusion is resolved by steps 5, 6 and 7. The source eNB can request SI acquisition and reporting for any PCI, not limited to PSCs/PCIs of CSG or hybrid cells.

An outbound mobility to CSG cells is described. It may refer to a section 10.5.2 of 3GPP TS 36.300 V10.5.0 (2011 September). For a UE leaving a CSG cell in RRC_IDLE, normal cell reselection based on configuration from the BCCH of the CSG cell applies. For a UE leaving a CSG cell in RRC_CONNECTED, normal network controlled mobility applies.

A proximity indication is described. As described above, the proximity indication is to indicate that the UE is entering or leaving the proximity of one or more CSG member cells. The detection of proximity is based on an autonomous search function.

Figure 6:
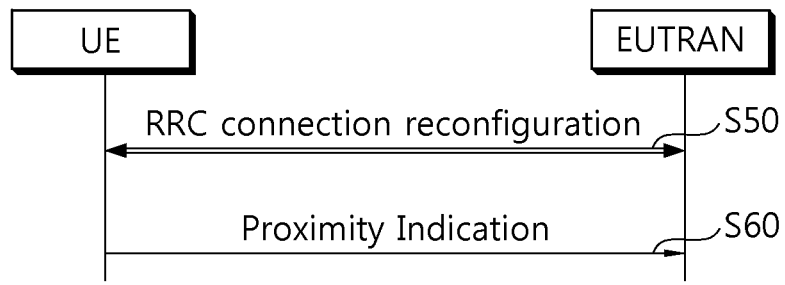
FIG. 6 shows an example of a proximity indication procedure.

FIG. 6 shows an example of a proximity indication procedure.

Referring to FIG. 6, at step S50, the UE and the E-UTRAN perform an RRC connection reconfiguration procedure. At step S60, the UE transmit a proximity indication to the E-UTRAN.

A UE in RRC_CONNECTED may perform as follows:

1> if the UE enters the proximity of one or more CSG member cell(s) on an E-UTRA frequency while proximity indication is enabled for such E-UTRA cells; or 1> if the UE enters the proximity of one or more CSG member cell(s) on an UTRA frequency while proximity indication is enabled for such UTRA cells; or 1> if the UE leaves the proximity of all CSG member cell(s) on an E-UTRA frequency while proximity indication is enabled for such E-UTRA cells; or 1> if the UE leaves the proximity of all CSG member cell(s) on an UTRA frequency while proximity indication is enabled for such UTRA cells:

2> if the UE has previously not transmitted a Proximity-Indication for the RAT and frequency during the current RRC connection, or if more than 5 s has elapsed since the UE has last transmitted a ProximityIndication (either entering or leaving) for the RAT and frequency:

3> initiate transmission of the ProximityIndication message;

The UE shall set the contents of ProximityIndication message as follows:

1> if the UE applies the procedure to report entering the proximity of CSG member cell(s):

2> set type to entering;

1> else if the UE applies the procedure to report leaving the proximity of CSG member cell(s):

2> set type to leaving;

1> if the proximity indication was triggered for one or more CSG member cell(s) on an E-UTRA frequency:

2> set the carrierFreq to eutra with the value set to the E-ARFCN value of the E-UTRA cell(s) for which proximity indication was triggered;

1> else if the proximity indication was triggered for one or more CSG member cell(s) on a UTRA frequency:

2> set the carrierFreq to utra with the value set to the ARFCN value of the UTRA cell(s) for which proximity indication was triggered;

The UE shall submit the ProximityIndication message to lower layers for transmission.

If a UE is a member of a CSG cell and interested to receive an MBMS service, the UE should prioritize between the CSG cell and the MBMS service. It is because the UE may not receive the MBMS service while UE is in the CSG cell. As described above, when the UE is in the proximity of the CSG cell, the UE transmits a proximity indication. As a result, an eNB will perform a handover procedure for the UE to the CSG cell. This handover procedure will be done even if the UE prefers to receive the MBMS service, rather than to move to the CSG cell. Thus, the UE may not receive the MBMS service due to handover to the CSG cell, regardless of UE's preference.

To solve the problem described above, a method for determining whether to transmit a proximity indication for a CSG cell according to a preference for an MBMS service while receiving the MBMS service. According to an embodiment of the present invention, a UE enters a proximity of a CSG cell while receiving an MBMS service. If the UE prefers to receive the MBMS service, the UE may not transmit a proximity indication. Else, the UE may transmit the proximity indication.

Figure 7:
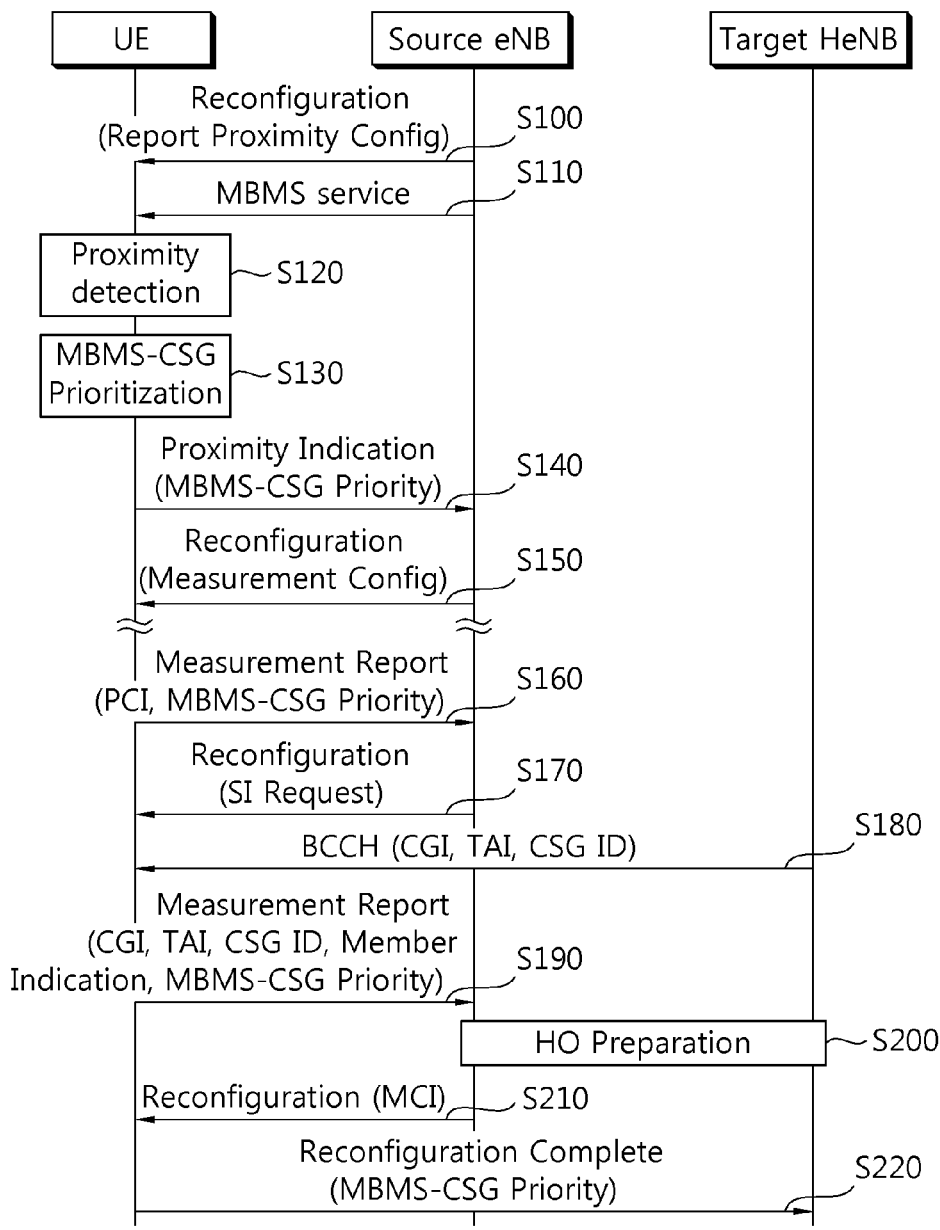
FIG. 7 shows an example of a method of receiving a service according to an embodiment of the present invention.

FIG. 7 shows an example of a method of receiving a service according to an embodiment of the present invention. FIG. 7 shows an example of an inbound mobility from a non-CSG cell to a CSG cell, e.g., in case that the CSG cell has a higher priority than an MBMS service.

Referring to FIG. 7, at step S100, a source eNB transmits an RRC connection reconfiguration message to a UE. The RRC connection reconfiguration message may include 'Report Proximity Config' that enables the UE to transmit a proximity indication in case that UE enters or leaves a proximity of a CSG cell.

At step S110, the UE becomes interested to receive an MBMS service. The UE may receive the MBMS service from the source eNB.

At step S120, the UE determines that it may be near a cell (based on autonomous search procedures) whose CSG ID is in the UE's CSG whitelist.

At step S130, if the UE is receiving the MBMS service, the UE prioritizes between the MBMS service and the CSG cell which the UE sent the proximity indication for (i.e., MBMS-CSG prioritization).

At step S140, the UE may transmit an entering proximity indication when it determines it may be near a cell (based on autonomous search procedures) whose CSG ID is in the UE's CSG whitelist. The proximity indication includes the RAT and frequency of the cell.

If the MBMS service has a higher priority than the CSG cell, the UE decides not to transmit the proximity indication to the source eNB. Otherwise, the UE transmits the proximity indication to the source eNB.

Alternatively, if the MBMS service has a higher priority than the CSG cell, the UE transmit the proximity indication that includes an MBMS-CSG priority indicating that the MBMS service has a higher priority than the CSG cell. Otherwise, the UE transmit the proximity indication that includes an MBMS-CSG priority indicating that the MBMS service has a lower priority than the CSG cell.

At step S150, if a measurement configuration is not present for the concerned frequency/RAT, the source eNB configures the UE with relevant measurement configuration including measurement gaps as needed, so that the UE can perform measurements on the reported RAT and frequency. The network may also use the proximity indication to minimize the requesting of handover preparation information of CSG/hybrid cells by avoiding requesting such information when the UE is not in the geographical area where cells whose CSG IDs are in the UEs CSG whitelist are located.

At step S160, the UE transmits a measurement report including the PCI (e.g., due to triggered event A3). In addition, if the UE does not include the MBMS-CSG priority in the proximity indication, the UE can also include the MBMS-CSG priority in the measurement report.

Alternatively, if the MBMS service has a higher priority than the CSG cell, the UE may decide not to transmit the measurement report to the source eNB.

At step S170, the source eNB configures the UE to perform SI acquisition and reporting of a particular PCI.

At step S180, the UE performs SI acquisition using autonomous gaps, i.e., the UE may suspend reception and transmission with the source eNB within the limits to acquire the relevant system information from the target HeNB.

At step S190, the UE transmits a measurement report including (E-)CGI, TAI, CSG ID and "member/non-member" indication. In addition, if necessary, the UE can also include the MBMS-CSG priority in the measurement report.

Alternatively, if the MBMS service has a higher priority than the CSG cell, the UE may decide not to transmit the measurement report to the source eNB.

At step S200, the source eNB initiates handover preparation with the target eNB. The source eNB may send the MBMS-CSG priority to the target eNB during this handover preparation.

At step S210, upon reception of the RRC connection reconfiguration message including mobility Control information (MCI), the UE performs handover to the target cell.

At step S220, if the UE successfully accesses to the target cell by performing random access, the UE transmits the RRC connection reconfiguration complete message to the target eNB. If necessary, the UE can include the MBMS-CSG priority in the RRC connection reconfiguration complete message.

Figure 8:
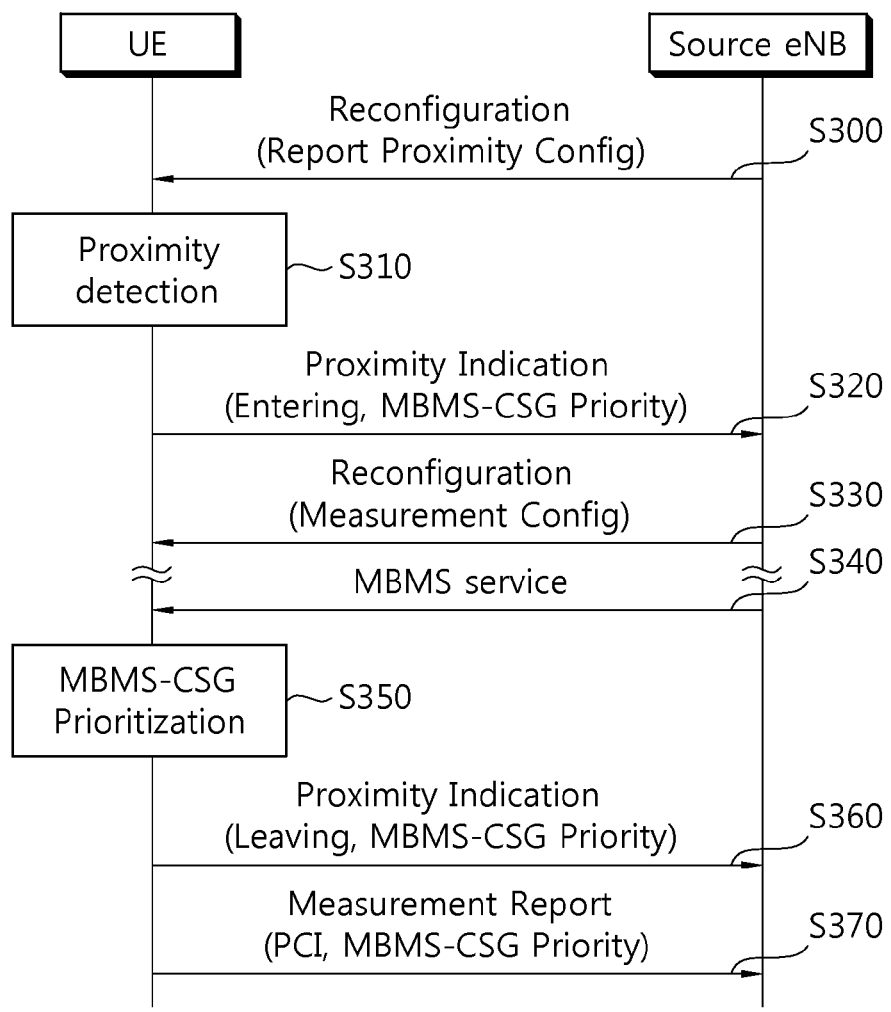
FIG. 8 shows another example of a method of receiving a service according to an embodiment of the present invention.

FIG. 8 shows another example of a method of receiving a service according to an embodiment of the present invention. FIG. 8 shows an example of transmission of a proximity indication in case that the CSG cell has a lower priority than an MBMS service.

Referring to FIG. 8, at step S300, the source eNB transmits an RRC connection reconfiguration message to the UE. The RRC connection reconfiguration message may include 'Report Proximity Config' that enables the UE to transmit a proximity indication in case that the UE enters or leaves the proximity of a CSG cell.

At step S310, the UE determines it may be near a cell (based on autonomous search procedures) whose CSG ID is in the UE's CSG whitelist.

At step S320, the UE transmits an entering proximity indication when it determines it may be near a cell (based on autonomous search procedures) whose CSG ID is in the UE's CSG whitelist. The proximity indication may include the RAT and frequency of the cell, and an MBMS-CSG priority indicating which has a higher priority between the MBMS service and the CSG cell.

At step S330, if a measurement configuration is not present for the concerned frequency/RAT, the source eNB configures the UE with relevant measurement configuration including measurement gaps as needed, so that the UE can perform measurements on the reported RAT and frequency. The network may also use the proximity indication to minimize the requesting of handover preparation information of CSG/hybrid cells by avoiding requesting such information when the UE is not in the geographical area where cells whose CSG IDs are in the UEs CSG White-list are located.

At step S340, the UE becomes interested to receive an MBMS service. The UE may receive the MBMS service from the source eNB.

At step S350, if the UE is receiving the MBMS service, the UE prioritizes between the MBMS service and the CSG cell which the UE sent the proximity indication for, i.e., MBMS-CSG prioritization.

At step S360, in case that the UE has previously transmit the proximity indication for the CSG cell, and if the MBMS service has a higher priority than the CSG cell, the UE transmit a leaving proximity indication. The UE may also transmit an MBMS-CSG priority which indicates that the MBMS service has a higher priority than the CSG cell. Alternatively, the UE may transmit the proximity indication indicating cancelling entering to the CSG cell for the MBMS service and the MBMS-CSG priority which indicates that the MBMS service has a higher priority than the CSG cell At step S370, the UE transmits a measurement report including the PCI (e.g., due to triggered event A3). In addition, if the UE does not include the MBMS-CSG priority in the proximity indication, the UE can also include the MBMS-CSG priority in the measurement report.

Alternatively, if the MBMS service has a higher priority than the CSG cell, the UE may decide not to transmit the measurement report to the source eNB.

In embodiments of the present invention described above discloses a method for determining whether to transmit a proximity indication for a CSG cell according to a preference for an MBMS service while receiving the MBMS service. However, an embodiment of the present invention is not limited thereto. The CSG cell may be replaced with a small cell or a wireless local area network (WLAN). The CSG cell, the small cell, and the WLAN may be deployed similarly in that coverage of the CSG cell, the small cell, and the WLAN is relatively smaller that coverage of a macro cell. The CSG cell may be deployed sparsely in coverage of the macro cell. The small cell may be deployed densely, and may be deployed in coverage of the macro cell or out of coverage of the macro cell. The WLAN may have different interfaces from the macro cell, and may not be able to exchange information with the macro cell directly. In addition, an embodiment of the present invention is not limited to the MBMS service.

Figure 9:
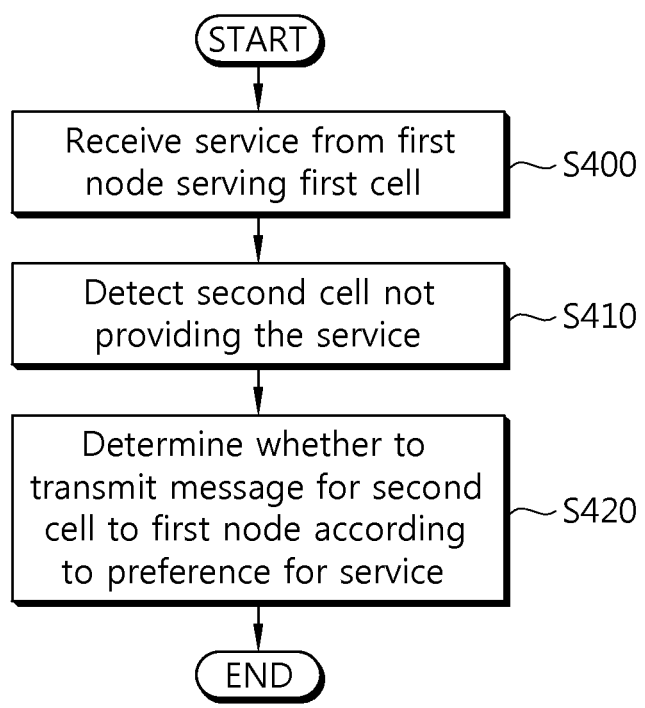
FIG. 9 shows another example of a method of receiving a service according to an embodiment of the present invention.

FIG. 9 shows another example of a method of receiving a service according to an embodiment of the present invention.

At step S400, a UE receives a service from a first node. The first node serves a first cell. At step S410, the UE detects a second cell, not providing the service, neighboring the UE. At step S420, the UE determines whether to transmit a message for the second cell to the first node according to a preference for the service. The service may be an MBMS service. The second cell may be a CSG cell. The message may be a proximity indication or a measurement report. The UE may transmit the message to the first node if it is determined to transmit the message for the second cell.

Figure 10:
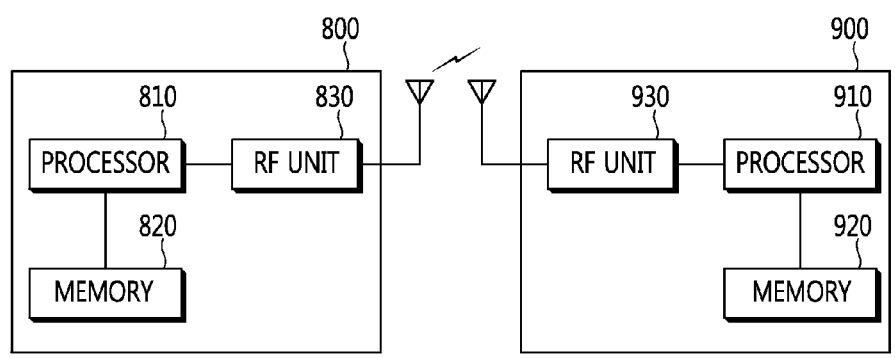
FIG. 10 is a block diagram showing wireless communication system to implement an embodiment of the present invention.

FIG. 10 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for receiving a multimedia broadcast/multicast service (MDMS) service in a wireless communication system, the method comprising:
    receiving, by a user equipment (UE), a reconfiguration message from a source base station,
    wherein the reconfiguration message includes information related to a proximity indication indicating a proximity of the UE with a closed subscriber group (CSG) cell;
    receiving, by the UE, the MBMS service from the source base station;
    detecting, by the UE, the CSG cell among a plurality of neighboring cells,
    wherein the CSG cell includes same CSG identifier that is included in a CSG whitelist of the UE, and
    wherein the CSG cell does not provide the MBMS service;
    determining, by the UE, whether the receiving of the MBMS service has a higher priority than an entering to the CSG cell;
    selectively transmitting, by the UE, the proximity indication to the source base station based on the determining,
    wherein if it is determined that the receiving of the MBMS service has the higher priority than the entering to the CSG cell, the UE does not transmit the proximity indication to the source base station or the UE transmits the proximity indication including a priority between the receiving of the MBMS service and the entering to the CSG cell.

2. A user equipment (UE) for receiving a multimedia broadcast/multicast service (MBMS) service in a wireless communication system, the UE comprising:
    a radio frequency (RF) unit for transmitting or receiving a radio signal; and
    a processor coupled to the RF unit, and configured for:
    receiving a reconfiguration message from a source base station,
    wherein the reconfiguration message includes information related to a proximity indication indicating a proximity of the UE with a closed subscriber group (CSG) cell;
    receiving the MBMS service from the source base station;
    detecting the CSG cell among a plurality of neighboring cells,
    wherein the CSG cell includes same CSG identifier that is included in a CSG whitelist of the UE, and
    wherein the CSG cell does not provide the MBMS service;
    determining whether the receiving of the MBMS service has a higher priority than an entering to the CSG cell;
    selectively transmitting the proximity indication to the source base station based on the determining,
    wherein if it is determined that the receiving of the MBMS service has the higher priority than the entering to the CSG cell, the UE does not transmit the proximity indication to the source base station or the UE transmits the proximity indication including a priority between the receiving of the MBMS service and the entering to the CSG cell.

3. The method of claim 1, further comprising: receiving, by the UE, a second reconfiguration message from the source base station, wherein the second reconfiguration message includes configuration information for a measurement.

4. The method of claim 1, further comprising: transmitting, by the UE, a measurement report to the source base station, wherein the measurement report includes a physical cell identity (PCI) or the priority between the receiving of the MBMS service and the entering to the CSG cell.

5. The method of claim 1, further comprising: receiving, by the UE, a request for system information (SI) from a target base station.

6. The method of claim 5, further comprising: receiving, by the UE, information related to at least one of cell group identity (CGI), tracking area identity (TAI), or CSG identity (CSG ID) through a broadcast control channel (BCCH).

7. The method of claim 1, further comprising: transmitting, by the UE, a measurement report to the source base station, wherein the measurement report includes at least one of cell group identity (CGI), tracking area identity (TAI), CSG identity (CSG ID), member indication, or the priority between the receiving of the MBMS service and the entering to the CSG cell.

* * * * *